United States Patent
Arunski et al.

(10) Patent No.: US 11,144,593 B2
(45) Date of Patent: Oct. 12, 2021

(54) INDEXING STRUCTURE WITH SIZE BUCKET INDEXES

(71) Applicant: EMC IP Holding Company LLC, Hopkinton, MA (US)

(72) Inventors: Kevin J. Arunski, Sterling, VA (US); Scott Moore, Fredericksburg, VA (US)

(73) Assignee: EMC IP Holding Company LLC, Hopkinton, MA (US)

(*) Notice: Subject to any disclaimer, the term of this patent is extended or adjusted under 35 U.S.C. 154(b) by 161 days.

(21) Appl. No.: 16/177,865

(22) Filed: Nov. 1, 2018

(65) Prior Publication Data

US 2020/0143001 A1  May 7, 2020

(51) Int. Cl.
*G06F 16/901* (2019.01)
*G06F 16/903* (2019.01)
*G06F 16/904* (2019.01)

(52) U.S. Cl.
CPC .......... *G06F 16/901* (2019.01); *G06F 16/903* (2019.01); *G06F 16/904* (2019.01)

(58) Field of Classification Search
None
See application file for complete search history.

(56) References Cited

U.S. PATENT DOCUMENTS

| | | | |
|---|---|---|---|
| 6,530,008 B1 * | 3/2003 | Lin | G06F 16/21 711/171 |
| 7,284,011 B1 * | 10/2007 | Narayanaswamy | G06F 16/283 707/700 |
| 2002/0099691 A1 | 7/2002 | Lore et al. | |
| 2008/0244433 A1 * | 10/2008 | Behnen | G06F 16/951 715/771 |
| 2018/0121503 A1 * | 5/2018 | Bakke | G06F 16/14 |
| 2018/0247072 A1 * | 8/2018 | Hind | G06F 21/604 |

* cited by examiner

*Primary Examiner* — Neveen Abel Jalil
*Assistant Examiner* — John J Morris
(74) *Attorney, Agent, or Firm* — Ryan, Mason & Lewis, LLP

(57) ABSTRACT

A method includes determining a set of sizes for size bucket indexes of an indexing structure, and indexing a plurality of records into the size bucket indexes. The indexing comprises, for a given record, rounding a size of the given record to a nearest one of the determined set of sizes and placing the given record in a size bucket index associated with the nearest one of the determined set of sizes. The method also includes receiving one or more queries to the plurality of records, a given one of the queries specifying a record size. The method further includes processing the given query utilizing the indexing structure by mapping the specified record size to at least a given one of the size bucket indexes and returning one or more records from the given size bucket index.

20 Claims, 5 Drawing Sheets

INDEXING STRUCTURE WITH SIZE BUCKET INDEXES

FIELD

The field relates generally to information processing, and more particularly to managing data in information processing systems.

BACKGROUND

Various information processing systems provide capabilities for searching and retrieving stored data. In systems which store or manage large amounts of data, indexing structures may be used to provide efficient search, update, retrieval and other query capabilities. An indexing structure may contain indexes for different files, network sessions or other records that are to be indexed. As the amount of data increases, however, the amount of storage and computing resources required to store and maintain the indexing structure also increases.

SUMMARY

Illustrative embodiments of the present invention provide techniques for generating an indexing structure that indexes records based on size using size buckets. Such indexing structures advantageously improve efficiency of the indexing structure through the reduced utilization of memory and storage resources, and also provide for more efficient querying of records in the indexing structure.

In one embodiment, a method comprises determining a set of sizes for size bucket indexes of an indexing structure, and indexing a plurality of records into the size bucket indexes. The indexing comprises, for a given record, rounding a size of the given record to a nearest one of the determined set of sizes and placing the given record in a size bucket index associated with the nearest one of the determined set of sizes. The method also comprises receiving one or more queries to the plurality of records, a given one of the queries specifying a record size. The method further comprises processing the given query utilizing the indexing structure by mapping the specified record size to at least a given one of the size bucket indexes and returning one or more records from the given size bucket index. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
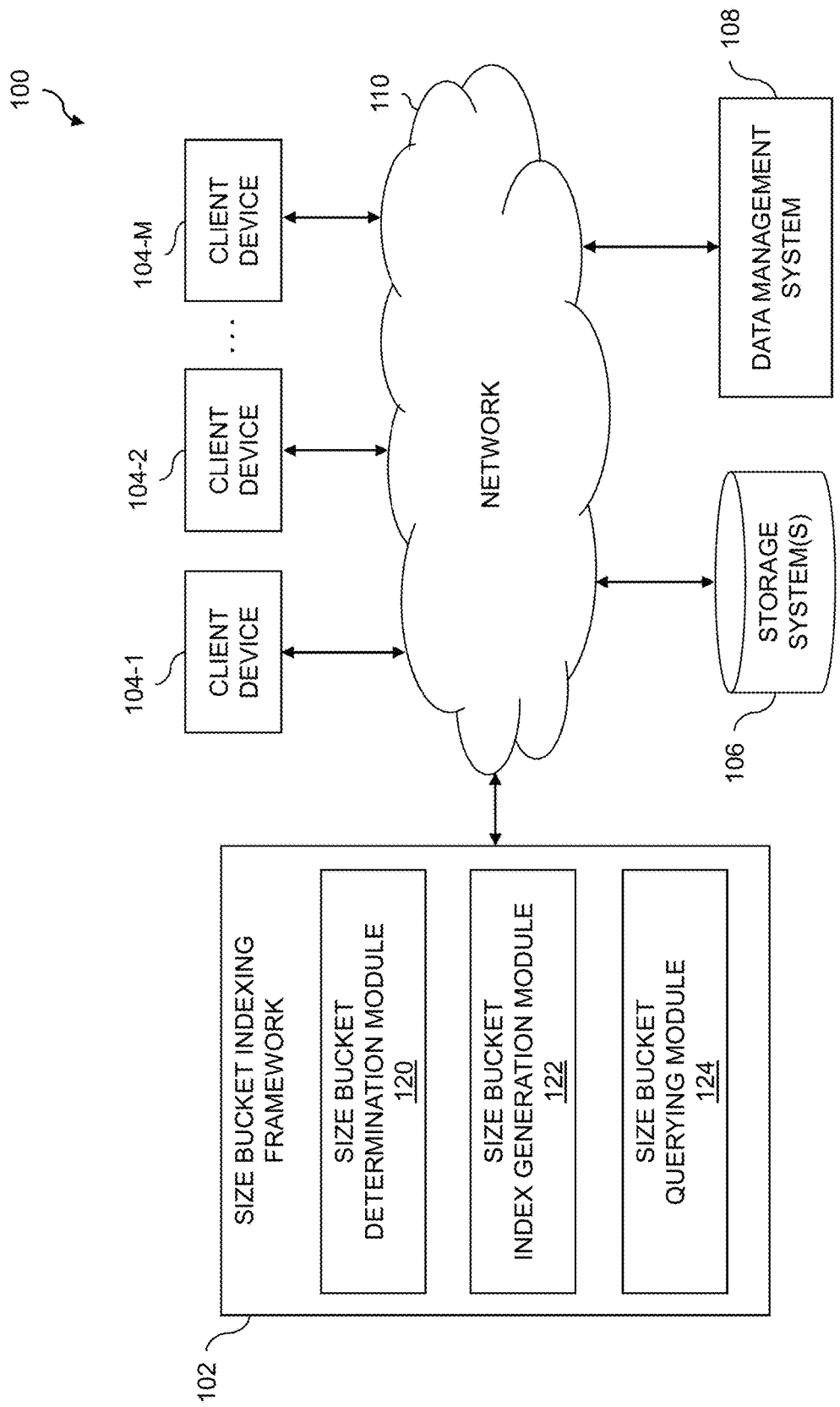
FIG. 1 is a block diagram of an information processing system for generating an indexing structure with size bucket indexing in an illustrative embodiment of the invention.

FIG. 1 shows an information processing system 100 configured in accordance with an illustrative embodiment. The information processing system 100 is assumed to be built on at least one processing platform and provides functionality for generating and utilizing an indexing structure with size bucket indexing utilizing a size bucket indexing framework 102. The size bucket indexing framework 102 manages the generation of at least a portion of an indexing structure for a data management system 108, which may store records or other data in one or more storage systems 106. The data management system 108 may provide functionality for querying records from the storage systems 106 utilizing an indexing structure at least partially generated and maintained by the size bucket indexing framework 102. The term "query" is used herein to broadly refer to operations such as search, update and retrieval of records or other data of a data set.

In some embodiments, the data management system 108 may comprise a threat detection and remediation system (e.g., the RSA NetWitness® platform) which maintains a database of network or other user or computing sessions to detect anomalous behavior which may represent malware or other threats to an enterprise. The data management system 108 may also or alternatively comprise a log message collection and processing system for an enterprise or other entity, which collects log messages or other records from various managed devices or other log or event record sources. The data management system 108 may further or alternatively comprise any type of system which maintains a database of files or other records, and for which it is desired to maintain an index thereof that supports querying based on file or record size.

The storage systems 106 may comprise one or multiple different storage systems which collectively provide a system of records for storing data managed by the data management system 108. Although shown as separate in FIG. 1, in some embodiments at least a portion of the storage systems 106 may be part of the data management system 108 or the size bucket indexing framework 102. Also, the size bucket indexing framework 102 may be implemented at least in part internally to the data management system 108.

The storage systems 106 provide data sources for records that are accessed by various users or data consumers via client devices 104-1, 104-2, . . . 104-M (collectively, client devices 104). In some embodiments, the client devices 104 submit search, update, retrieval or other query requests to the data management system 108 for records stored in the storage systems 106. The data management system 108 may utilize an indexing structure which indexes files, sessions or other records based on their size and other characteristics to speed up such search and retrieval. In some embodiments, the size bucket indexing framework 102 improves the efficiency of the indexing structure, through indexing files, sessions or other records utilizing size "buckets" as will be described in further detail below.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The size bucket indexing framework 102, client devices 104, storage system 106 and data management system 108 may be connected via at least one network 110. The network 110 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The size bucket indexing framework 102 implements a number of functional modules for generating at least a portion of an indexing structure, including a size bucket determination module 120, a size bucket index generation module 122, and a size bucket querying module 124.

The size bucket determination module 120 is configured to determine a set of sizes for size bucket indexes of an indexing structure. In some embodiments, the sizes are whole-number values of kilobytes (KB), megabytes (MB), gigabytes (GB), etc. In other embodiments, the sizes may be other designated sizes of interest. For example, there may be a minimum size (e.g., 200 bytes), and the sizes for the size bucket indexes may be designated multiples of that minimum size (e.g., 200 bytes, 400 bytes, 600 bytes, etc.). As another example, it may be desired to have a designated number of size bucket indexes (e.g., 10), and thus the sizes may be determined by splitting the possible range of sizes into the designated number of size bucket indexes (e.g., for a range of sizes between 0 and 1000 bytes, the size bucket indexes may be 0 bytes, 100 bytes, 200 bytes, etc.). The set of sizes may also or alternatively be based on determining a distribution of record sizes, and selecting the sizes so as to split the records evenly into the different size bucket indexes. Various other examples are possible, including having the size bucket indexes be associated with certain sizes that are meaningful for a particular context (e.g., multiples of a designated block size for files in a block-based storage system, various sizes associated with malicious and non-malicious network sessions, etc.).

The size bucket index generation module 122 is configured to index a plurality of records (e.g., network sessions in a database, files stored in a storage system, etc.) into the size bucket indexes determined by the size bucket determination module 120. This indexing may include rounding the sizes of records to a nearest one of the set of determined sizes and placing each of the records into the size bucket index for its associated nearest one of the set of determined sizes. In some embodiments, this rounding is down to the nearest one of the determined set of sizes (e.g., for whole-number KB size bucket indexes, a record with a size greater than 1 KB but less than 2 KB will be placed into the 1 KB size bucket index). In other embodiments, however, other types of rounding may be used.

The size bucket querying module 124 is configured to receive queries that are directed to the records indexed by the indexing structure, where the queries specify a record size. It should be noted that a query may specify other query parameters (e.g., a file owner, a network address for a network session, parameters related to the content of the records, etc.) in addition to a record size. The size bucket indexes of the indexing structure are used to parse or process the queries using a specified record size, which may be a specified range of record sizes, and to return results matching the specified record size. Further processing may be used to evaluate any other query parameters, possibly using additional indexing structures. To process the queries, the size bucket querying module 124 maps the specified record size for a given query to at least a given one of the size bucket indexes, and returns records from the given size bucket index.

It is to be appreciated that the particular arrangement of the size bucket indexing framework 102, client devices 104, storage systems 106 and data management system 108 illustrated in the FIG. 1 embodiment is presented by way of example only, and alternative arrangements can be used in other embodiments. As an example, the functionality associated with the size bucket determination module 120, the size bucket indexing generation module 122, and the size bucket querying module 124 may in some embodiments be combined into fewer modules, or may be separated across more modules, with the multiple modules possible being implemented with multiple distinct processors or processing devices. As another example, the size bucket indexing framework 102 and/or storage systems 106 may be implemented at least in part within the data management system 108.

At least portions of the size bucket determination module 120, the size bucket index generation module 122, and the size bucket querying module 124 may be implemented at least in part in the form of software that is stored in memory and executed by a processor.

An exemplary process for generating at least a portion of an indexing structure that indexes files, sessions or other records utilizing size buckets will now be described in more detail with reference to the flow diagram of FIG. 2. It is to be understood that this particular process is only an example, and that additional or alternative processes for generating an indexing structure that indexes records utilizing size buckets can be carried out in other embodiments.

In this embodiment, the process includes steps 200 through 206. These steps are assumed to be performed by the size bucket indexing framework 102 utilizing the size bucket determination module 120, the size bucket index generation module 122, and the size bucket querying module 124. The process begins with step 200, determining a set of sizes for size bucket indexes of an indexing structure. The determined set of sizes may comprise whole-number values of KB, MB, GB, etc. The determined set of sizes may alternately or additionally comprise various designated threshold sizes, which may be pre-defined or user-defined based on context. As noted above, the determined set of sizes may be multiples of a designated minimum size, may be determined by splitting a possible range of record sizes into a specific number of size bucket indexes, etc.

In step 202, a plurality of records are indexed into the size bucket indexes. The records may be network sessions in a network session database, files stored in a storage system, etc. The indexing in step 202 may comprise, for a given record, rounding a size of the given record to a nearest one of the determined set of sizes and placing the given record in a size bucket index associated with the nearest one of the determined set of sizes. The rounding may include rounding the size of the given record down to its nearest one of the determined set of sizes.

In step 204, one or more queries to the plurality of records are received. The queries illustratively specify a record size, which may be a range of record sizes as described in further detail below. The queries may also include additional parameters other than record size, which may be evaluated using additional indexing structures or parsing the records returned by querying based on record size to further narrow results. The queries are processed in step 206 utilizing the indexing structure by mapping the specified record sizes of the queries to at least a given one of the size bucket indexes and returning one or more records from the given size bucket index.

In some embodiments, the specified record size of a given query received in step 204 is a given one of the determined set of sizes (e.g., the specified record size is exactly equal to a designated one of the sizes determined in step 200). In such cases, processing the given query in step 206 will return the records in the size bucket index associated with that size. In some embodiments, all of the records in the size bucket index are returned. If the number of records to be returned will exceed some designated threshold, the results may be limited to the first X records in that size bucket index. The specified record size in the given query received in step 204 may be a human-readable form of the given size, such as a textual string alias label for the given size (e.g., for a size bucket index with an associated size of 2048 bytes, the human-readable form or alias label may be "2 KB").

In other embodiments, the specified record size of a given query received in step 204 may not be one of the set of sizes determined in step 200. In such cases, processing the given query in step 206 may map the specified record size to its nearest size bucket index (e.g., rounding down to the nearest one of the set of sizes determined in step 200), and return a subset of the records in that size bucket index which have the specified record size. For example, assume that whole-number size bucket indexes are used, and that the given query specifies a record size of 2345 bytes. This record size will be rounded down to its nearest size bucket index (e.g., for 2048 bytes or 2 KB). From the records in the 2 KB size bucket index, only those with the size 2345 bytes are returned, if any.

In some embodiments, as noted above, the specified record size of a given query received in step 204 may be a range of record sizes (e.g., record size greater or less than X, record size between X and Y, etc.). In such cases, processing the given query in step 206 will return a subset of the records in at least a given one of the size bucket indexes which fall within the specified range of record sizes. It should be noted that the specified range of record sizes may span multiple size bucket indexes. Thus, processing the given query in step 206 may involve mapping the specified range of record sizes to at least two size bucket indexes, and returning records from each of the at least two size bucket indexes which fall within the specified range of record sizes. For example, assume that whole-number size bucket indexes are used, and that the given query specifies a range of record sizes between 1250 and 1750 bytes. For this query, the specified range falls within one size bucket index (e.g., for 1024 bytes or 1 KB, where records are indexed by rounding down to the nearest size), and records within that size bucket index which fall within the range of 1250 and 1750 bytes are returned. As another example, the given query may specify a range of record sizes greater than 1500 bytes, which would fall within multiple size bucket indexes (e.g., the 1024 bytes or 1 KB size bucket index, the 2048 or 2 KB size bucket index, etc.), and records in each of those size bucket indexes are returned (e.g., those records in the 1 KB size bucket index that are greater than 1500 bytes, along with all the records in the 2 KB size bucket indexes and other higher-size bucket indexes).

Figure 2:
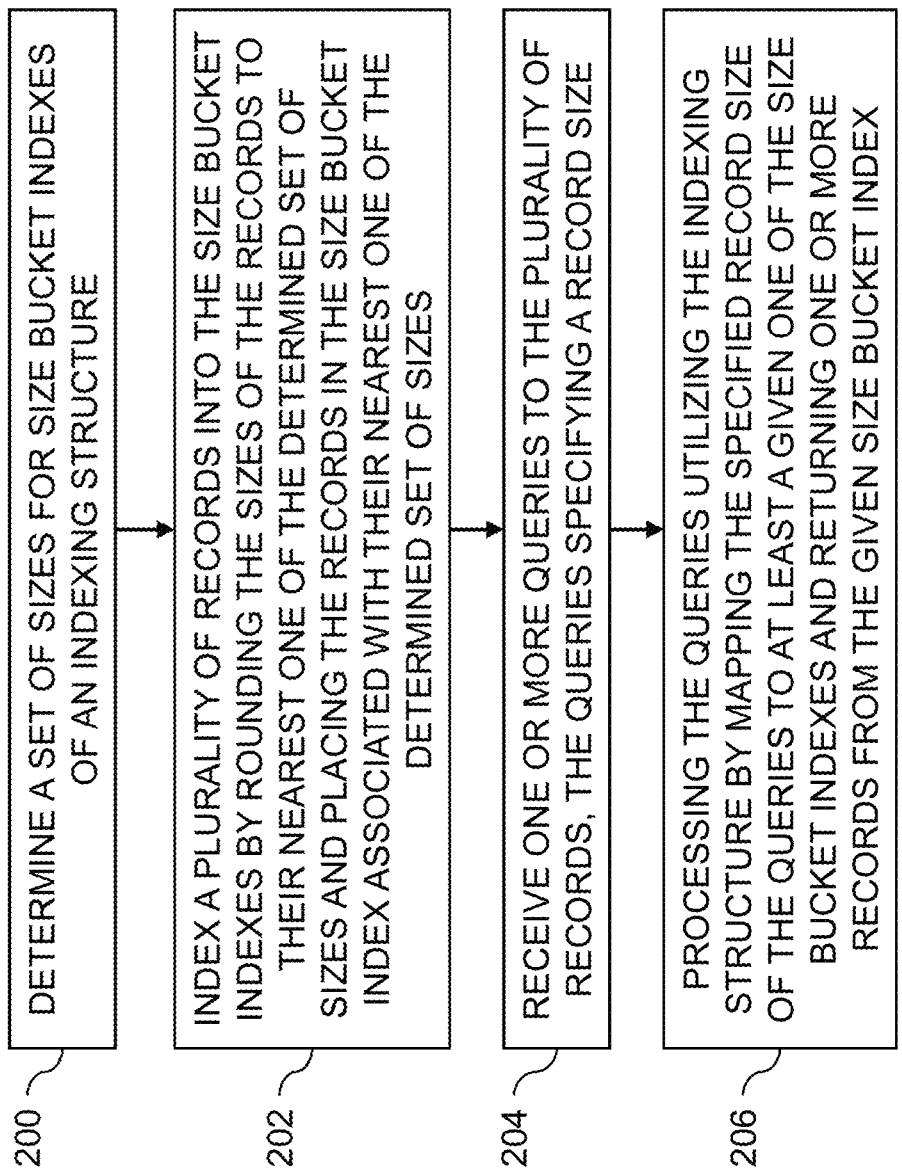
FIG. 2 is a flow diagram of an exemplary process for generating an indexing structure with size bucket indexing in an illustrative embodiment.

In some embodiments, the FIG. 2 process includes providing a graphical user interface (GUI) where two or more of the size bucket indexes are displayed or presented in the form of user-activatable interface features (e.g., selectable links, buttons, etc.). In such embodiments, receiving a given query in step 204 may include receiving or detecting activation of a given one of such user-activatable interface features (e.g., selection of a link or button corresponding to a given one of the size bucket indexes). Processing the query in step 206 may include modifying the GUI to present a view of at least a subset of the records for a given size bucket index associated with the selected user-activatable interface feature. In some embodiments, the GUI presents user-activatable interface features associated with some designated threshold number of the set of sizes determined in step 200, such as the sizes whose size bucket indexes have the most numbers of records, the most frequently queried size bucket indexes, etc. The GUI may also or alternatively provide a mechanism for a user to select or input a specified record size or range of record sizes for a query that may not be represented by one of the displayed user-activatable interface features.

Illustrative embodiments provide efficient mechanisms for storing numerical byte size values in a database index, while also providing organization of such values in a way that is convenient for humans to search for and read.

A database index is a data structure describing a mapping of values that appear within records of the database, to the records in which they appear. The database index provides a mechanism for the database to quickly resolve searches for those values by directly retrieving the records by traversing the data structure. The database index seeks to keep track of every record in which every unique value appears. In some embodiments, one of the values to be indexed is a "size" value, which is used to represent a variety of data properties, such as the size of a file, the size of a network download or network session, etc.

A size index may be constructed to maintain a separate list of records for every single possible size value (e.g., from 0 bytes or a minimum possible size up to a maximum possible size). Since the number of records in a database may be very large (e.g., millions, billions, etc.), the number of size values to be tracked becomes very large as well. Typically, the number of unique index entries for a size index is in the millions. Further, each of these values may only be associated with a few network sessions or files on average, and they tend to be spread out all over the data. The small list of sessions or files doesn't compress well, and thus wastes disk space and memory (e.g., random-access memory (RAM)).

To improve the efficiency of size indexing, some embodiments introduce a new indexing mode that can be used on size keys, referred to herein as "bucket mode" indexing. Through the use of bucket indexing, improvements in the database system performance are provided, including through the reduced use of storage and memory resources, increasing the speed of queries, etc. Bucket mode indexing works by rounding down sizes to their nearest "bucket"

rather than indexing every possible size. In some embodiments, the size buckets are whole-number values of KB, MB, GB, etc. In other embodiments, the size buckets may be certain designated sizes of interest, such as particular size thresholds that are useful for analyzing network sessions, file sizes, etc. for a particular use case scenario. In still other embodiments, combinations of whole-number size buckets and other designated sizes may be used for the size bucket indexes. By only storing the bucket values in the index, the number of index entries in the database index is drastically reduced, providing associated reduction in storage and memory resource consumption for maintaining the database index.

Advantageously, the use of a size bucket index avoids loss of functionality by preserving the original, non-bucketed size index in the database record. Non-bucket sizes may thus still be used to perform queries, so searches such as "find records with size>1024 bytes" or "find records with size exactly equal to 123456 bytes" are valid and evaluated correctly even if a size bucket indexing structure is used for a particular database or other collection of records. The size bucket indexing structure provides improved processing of such queries, by narrowing down the query enough so that the exact expression can be evaluated against a reduced set of records in the database.

The size bucket indexing structure also provides a novel record retrieval or query mechanism. In order to better match a user's expectations of searching for size values, the record retrieval mechanism produces two different behaviors depending on whether the user searches for an exact bucket value or some value that is not an exact bucket value. If the search value is an exact bucket value, the index returns all records that fall within that bucket. If the search value is not an exact bucket value, the index returns records that are only an exact match for the requested size.

As noted above, previous approaches for size value indexing require storage of each individual size value as a number representing the number of bytes. Such previous approaches produce size indexes that consume a large amount of RAM and disk space, and exhibit poor update performance. Illustrative embodiments that utilize size bucket indexing reduce the computing and storage resources required for maintaining the index, which means that more different types of size records can be indexed within the same hardware host.

One challenging task to accomplish in certain databases, such as the RSA NetWitness® core database, is querying and filtering using meta or query items that represent byte sizes. Though at face value such querying and filtering seems straightforward as sizes are just numbers, it is difficult to compare the size values in network sessions with search criteria. The traditional RSA NetWitness® index, however, does not handle the values in "size" particularly well as the RSA NetWitness® index tries to keep track of the sessions in which every unique value appears. Thus, this may require maintaining a separate list of sessions for every single possible value of size from some designated minimum size (e.g., 0 bytes) up to a maximum possible size. Since the number of sessions may be very large (e.g., in the millions or billions), the number of size values to track grows quickly. What's more, each of those size values may only be associated with one or a few sessions on average, and the size values tend to be spread out all over the data. The small list of sessions doesn't compress well thus wasting disk space, RAM and other computing resources.

To improve the efficiency of size indexing, some embodiments utilize bucket mode indexing as described above. In the bucket mode indexing, the database index rounds sizes down to their nearest bucket. The buckets, as noted above, may be whole-number values of KB, MB, GB, etc., or may be other designated sizes as desired. Size bucket indexing drastically reduces the number of index entries, and solves various database index performance issues. Advantageously, size bucket indexing does not lead to a loss of functionality even if a bucketed index is used. The bucketed index narrows down a query enough that an exact expression can be evaluated using the database index. There is a subtle difference in index behavior as noted above, where if the query criteria specifies an exact bucket value then the results returned will be all the sessions in that bucket. For example, in a database index which uses size bucket indexing with whole-number buckets and for a query asking for the size "2048" the index engine will identify this as exactly 2 KB and will thus return sessions with sizes that are greater than or equal to 2 KB, but less than 3 KB. To query a size value that exactly matches a size associated with one of the size bucket indexes, the user may specify a range (e.g., to query for records sizes of only 2 KB, the query may specify a range of records between 2047 and 2049 bytes). If the query criteria does not match an exact size associated with one of the size bucket indexes, the index engine narrows down the results to those sessions that match the value exactly. The reason for this behavior is to support a navigation view of a GUI in a logical way, while still allowing for more specific cases of the index to be utilized.

To use size bucket indexing on a custom database index for an RSA NetWitness® platform, some embodiments have a number of requirements. For example, the index format should be in unsigned integer 32-bit (UInt32) or unsigned integer 64-bit (UInt64). The index should also be indexed by value. Enabling size bucket indexing then requires addition of a bucket parameter to the custom index entry. An example bucket parameter is: <key name="size" description="size" format="UInt32" bucket="true" level="IndexValues"/>. After the index is saved or reloaded, the meta will be indexed with buckets. Notice that this also removes an explicit restriction on indexing "size" and thus it is acceptable to index this meta type. If using size bucketing, it is not necessary to specify a "valueMax" parameter, as the size buckets prevent the value max from reaching a large value.

Figure 3:
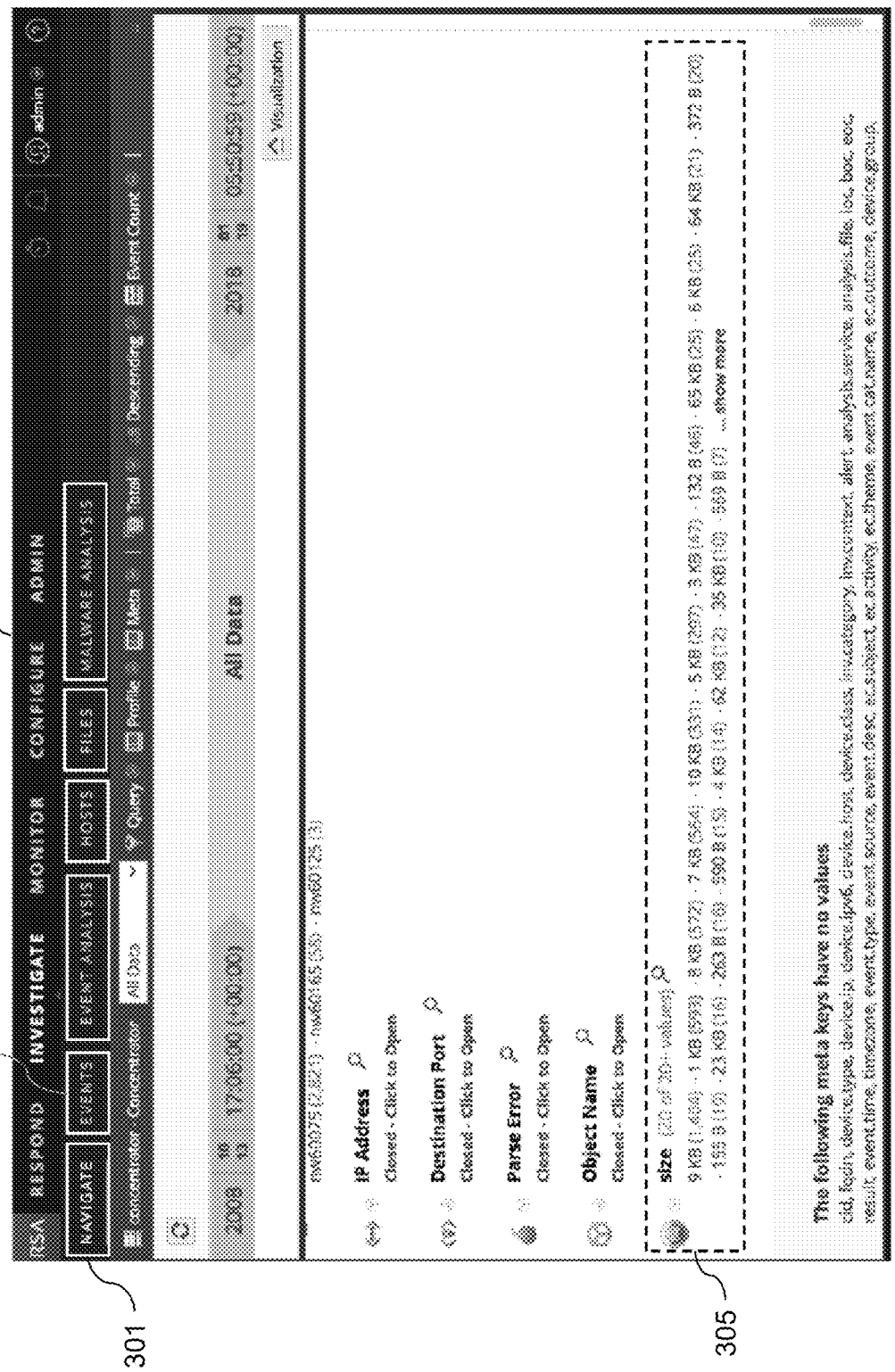
FIG. 3 is an example of a graphical user interface for utilizing an indexing structure with size bucket indexing in an illustrative embodiment.

Size bucket indexing structures may be used to provide a more useful navigation view for the RSA NetWitness® or other data management system 108. FIG. 3 shows an example GUI 300 of such a platform, showing a navigation view 301 thereof allowing a user to view and select indexes of records. The navigation view 301 will render the size buckets in human-readable form with the appropriate digital unit displayed, as shown in element 305. Therefore, sizes are shown as "1 MB", "11 MB", "1 TB", etc. The navigation report will also give totals for the number of sessions in the different buckets, thereby providing useful information about the most frequently encountered sizes of sessions in the database. In addition, the buckets are maintained, and may be selected (e.g., by activating a selectable user interface feature or link to one of the size buckets shown in element 305) to pivot to an events view 303 to see a listing of sessions that are in the selected bucket. The labels used for sizes are also supported as part of the raw query syntax, so a query may be specified using human-readable aliases such as: size>"1 KB" or size<"10 GB". Note that, in this case, the value should be placed in quotes because it is really a text label on the bucket.

While described above in the context of indexing network sessions, embodiments are not so limited. Other types of sessions, files, etc. may be indexed using size bucketing. For example, size bucketing may be used to index "bytes.src" and "rbytes" keys from log messages that create large indexes (e.g., firewall data, etc.). Further, it should be appreciated that particular implementation details may vary by use case. In some embodiments, for example, a maximum size may be set (e.g., of 32 MB or similar) where sessions that are larger than the maximum size are divided into multiple sessions with session.split meta. Therefore, queries may be limited to the maximum size (e.g., 32 MB) or less.

Embodiments provide various advantages relative to conventional techniques. Through the use of size bucket indexing, the storage and memory resources required for maintaining a database index may be reduced. Further, the size bucket indexing structure extends functionality of the index to permit new types of useful queries without loss of functionality as described above.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
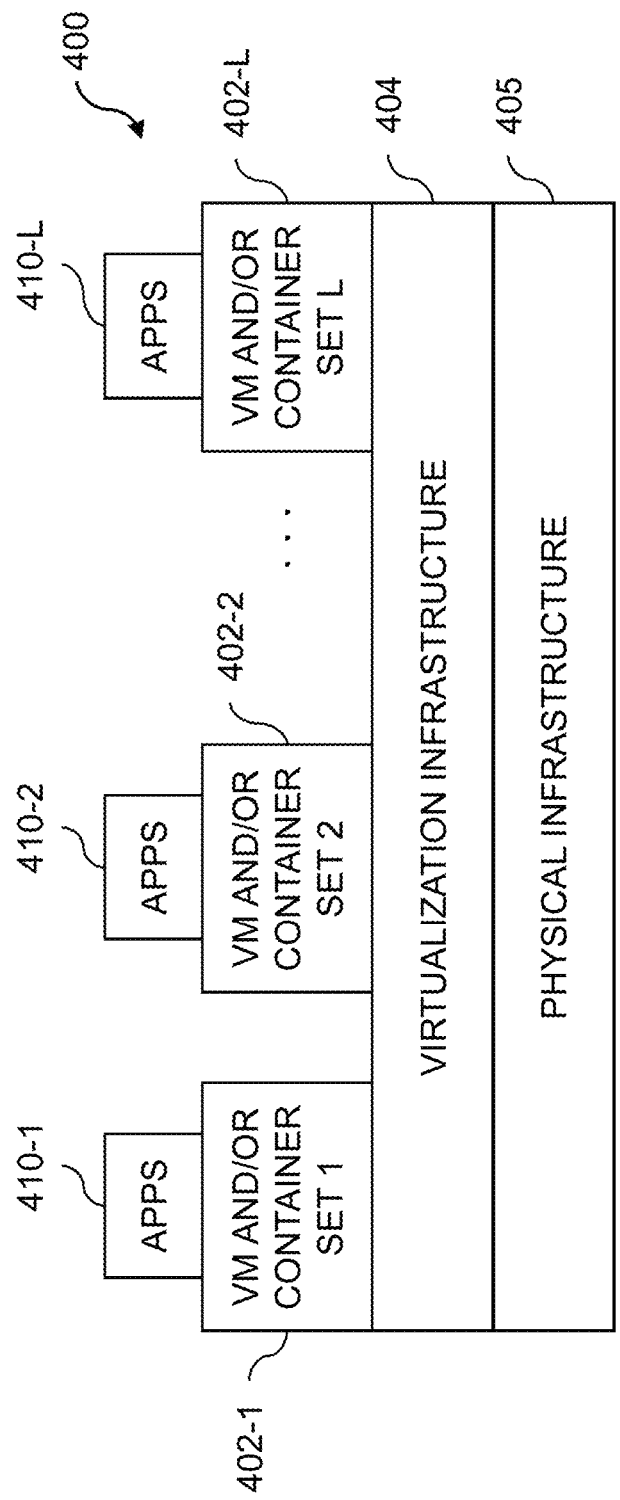
FIGS. 4 and 5 show examples of processing platforms that may be utilized to implement at least a portion of the FIG. 1 system.
Figure 5:
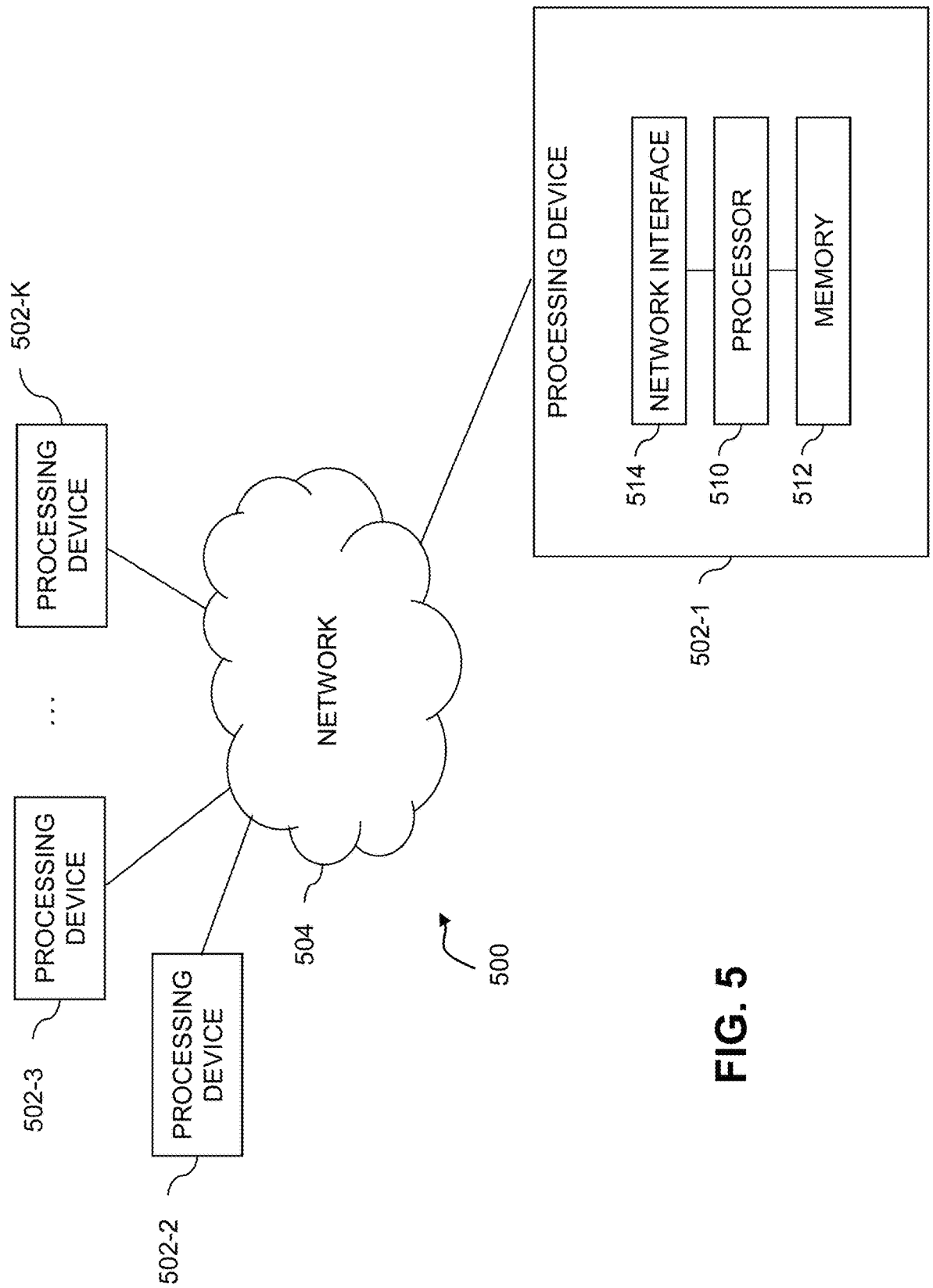

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide functionality for generating and utilizing an indexing structure with size bucket indexing of the type described above for one or more processes running on a given one of the VMs. For example, each of the VMs can implement such functionality for one or more processes running on that particular VM.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide functionality for generating and utilizing an indexing structure with size bucket indexing of the type described above for one or more processes running on different ones of the containers. For example, a container host device supporting multiple containers of one or more container sets can implement one or more instances of such functionality or logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating and utilizing an indexing structure with size bucket indexing as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, data management systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   determining a set of sizes for size bucket indexes of an indexing structure;
   associating textual string size labels with respective ones of the size bucket indexes;
   indexing a plurality of records into the size bucket indexes, wherein the indexing comprises, for a given record, rounding a given record size value of the given record to a nearest one of the determined set of sizes and placing an identifier of the given record in a size bucket index associated with the nearest one of the determined set of sizes;

receiving one or more queries to the plurality of records, a given one of the queries specifying a record size value; and processing the given query utilizing the indexing structure by mapping the specified record size value to one or more of the size bucket indexes;

wherein mapping the specified record size value to the one or more size bucket indexes comprises:

determining whether the specified record size value matches any of the textual string size labels;

responsive to determining that the specified record size value matches a given one of the textual string size labels, returning each of at least a subset of the records from a given one of the size bucket indexes associated with the given textual string size label; and responsive to determining that the specified record size value does not match any of the textual string size labels, rounding the specified record size value to one or more nearest ones of the textual string size labels and returning a subset of the records matching the specified record size value from one or more of the size bucket indexes associated with the one or more nearest ones of the textual string size labels;

wherein at least a subset of the plurality of records comprise network session records in a network sessions database;

wherein at least a first one of the size bucket indexes comprises a first size value range associated with known malicious network sessions;

wherein at least a second one of the size bucket indexes comprises a second size value range associated with known non-malicious network sessions; and wherein the method is performed by at least one processing device comprising a processor coupled to a memory.

2. The method of claim 1 wherein the determined set of sizes comprises whole-number values of at least one of: kilobytes, megabytes and gigabytes.

3. The method of claim 1 wherein the plurality of records comprise files stored in at least one storage system.

4. The method of claim 1 wherein indexing the given record comprises rounding down the size of the given record to a nearest one of the determined set of sizes.

5. The method of claim 1 wherein the textual string size labels comprise human-readable forms of the determined set of sizes for the size bucket indexes of the indexing structure.

6. The method of claim 5 wherein the human-readable forms comprise textual string alias labels for byte size values of the determined set of sizes for the size bucket indexes of the indexing structure.

7. The method of claim 1 wherein the specified record size value comprises a range of record sizes, and wherein processing the given query comprises returning a subset of records in the one or more size bucket indexes falling within the range of record sizes.

8. The method of claim 7 wherein the range of record sizes spans two or more of the size bucket indexes, and wherein processing the given query comprises mapping the range of record sizes to at least two of the size bucket indexes and returning a subset of records in the at least two size bucket indexes failing within the range of record sizes.

9. The method of claim 1 further comprising providing a graphical user interface presenting user-activatable interface features associated with respective ones of at least two of the size bucket indexes.

10. The method of claim 9 wherein receiving the given query comprises receiving activation of a selected one of the user-activatable interface features associated with a designated one of the size bucket indexes, and wherein processing the given query comprises modifying the graphical user interface to present a view of at least a subset of the records for the designated size bucket index associated with the selected user-activatable interface feature.

11. The method of claim 9 wherein the graphical user interface presents user-activatable interface features associated with a designated threshold number of the size bucket indexes most frequently accessed in the plurality of records.

12. The method of claim 1 wherein mapping the specified record size value to the one or more size bucket indexes comprises, responsive to determining that the specified record size value does not match any of the textual string size labels:

rounding the specified record size value down to a nearest one of the determined set of sizes; and returning a subset of the records from the given size bucket index associated with the nearest one of the determined set of sizes.

13. The method of claim 1 wherein the specified record size value comprises a specified record size range including a lower bound record size value and an upper bound record size value, and wherein mapping the specified record size value to the one or more size bucket indexes comprises:

mapping the lower bound record size value down to a first nearest one of the determined set of sizes;

mapping the upper bound record size value down to a second nearest one of the determined set of sizes; and returning (i) at least a first subset of records in a first one of the size bucket indexes from a first size bucket index associated with the first nearest one of the determined set of sizes, (ii) at least a second subset of records in a second one of the size bucket indexes from a second size bucket index associated with the second nearest one of the determined set of sizes, and (iii) records from any size bucket indexes having associated ones of the determined set of sizes between the first nearest one of the determined set of sizes and the second nearest one of the determined set of sizes.

14. The method of claim 1 wherein the given query further specifies one or more parameters in addition to the specified record size value, at least one of the one or more additional parameters comprising a network address for network sessions.

15. A computer program product comprising a non-transitory processor-readable storage medium having stored therein program code of one or more software programs, wherein the program code when executed by at least one processing device cause the at least one processing device:

to determine a set of sizes for size bucket indexes of an indexing structure;

to associate textual string size labels with respective ones of the size bucket indexes;

to index a plurality of records into the size bucket indexes, wherein the indexing comprises, for a given record, rounding a given record size value of the given record to a nearest one of the determined set of sizes and placing an identifier of the given record in a size bucket index associated with the nearest one of the determined set of sizes;

to receive one or more queries to the plurality of records, a given one of the queries specifying a record size value; and to process the given query utilizing the indexing structure by mapping the specified record size value to one or more of the size bucket indexes;

wherein mapping the specified record size value to the one or more size bucket indexes comprises:

determining whether the specified record size value matches any of the textual string size labels;

responsive to determining that the specified record size value matches a given one of the textual string size labels, returning each of at least a subset of the records from a given one of the size bucket indexes associated with the given textual string size label; and responsive to determining that the specified record size value does not match any of the textual string size labels, rounding the specified record size value to one or more nearest ones of the textual string size labels and returning a subset of the records matching the specified record size value from one or more of the size bucket indexes associated with the one or more nearest ones of the textual string size labels;

wherein at least a subset of the plurality of records comprise network session records in a network sessions database;

wherein at least a first one of the size bucket indexes comprises a first size value range associated with known malicious network sessions; and wherein at least a second one of the size bucket indexes comprises a second size value range associated with known non-malicious network sessions.

16. The computer program product of claim 15 wherein indexing the given record comprises rounding down the size of the given record to a nearest one of the determined set of sizes.

17. The computer program product of claim 15 wherein the program code when executed by the at least one processing device further causes the at least one processing device to provide a graphical user interface presenting user-activatable interface features associated with respective ones of at least two of the size bucket indexes, wherein receiving the given query comprises receiving activation of a selected one of the user-activatable interface features associated with a designated one of the size bucket indexes, and wherein processing the given query comprises modifying the graphical user interface to present a view of at least a subset of the records for the designated size bucket index associated with the selected user-activatable interface feature.

18. An apparatus comprising:

at least one processing device comprising a processor coupled to a memory;

the at least one processing device being configured:

to determine a set of sizes for size bucket indexes of an indexing structure;

to associate textual string size labels with respective ones of the size bucket indexes;

to index a plurality of records into the size bucket indexes, wherein the indexing comprises, for a given record, rounding a record size value of the given record to a nearest one of the determined set of sizes and placing an identifier of the given record in a size bucket index associated with the nearest one of the determined set of sizes;

to receive one or more queries to the plurality of records, a given one of the queries specifying a record size value; and to process the given query utilizing the indexing structure by mapping the specified record size value to one or more of the size bucket indexes;

wherein mapping the specified record size value to the one or more size bucket indexes comprises:

determining whether the specified record size value matches any of the textual string size labels;

responsive to determining that the specified record size value matches a given one of the textual string size labels, returning each of at least a subset of the records from a given one of the size bucket indexes associated with the given textual string size label; and responsive to determining that the specified record size value does not match any of the textual string size labels, rounding the specified record size value to one or more nearest ones of the textual string size labels and returning a subset of the records matching the specified record size value from one or more of the size bucket indexes associated with the one or more nearest ones of the textual string size labels;

wherein at least a subset of the plurality of records comprise network session records in a network sessions database;

wherein at least a first one of the size bucket indexes comprises a first size value range associated with known malicious network sessions; and wherein at least a second one of the size bucket indexes comprises a second size value range associated with known non-malicious network sessions.

19. The apparatus of claim 18 wherein indexing the given record comprises rounding down the size of the given record to a nearest one of the determined set of sizes.

20. The apparatus of claim 18 wherein the at least one processing device is further configured to provide a graphical user interface presenting user-activatable interface features associated with respective ones of at least two of the size bucket indexes, wherein receiving the given query comprises receiving activation of a selected one of the user-activatable interface features associated with a designated one of the size bucket indexes, and wherein processing the given query comprises modifying the graphical user interface to present a view of at least a subset of the records for the designated size bucket index associated with the selected user-activatable interface feature.

* * * * *